Nov. 4, 1969 P. HUSKA 3,475,979
AMPLIFIED MECHANICAL ACTUATOR
Original Filed Nov. 30, 1964 2 Sheets-Sheet 1
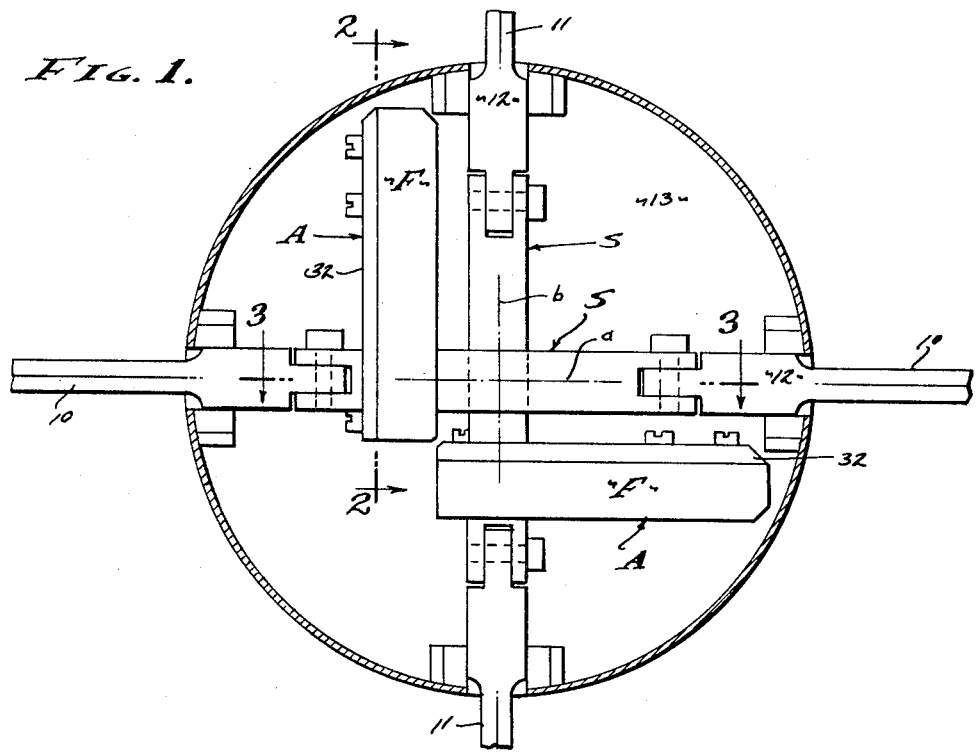
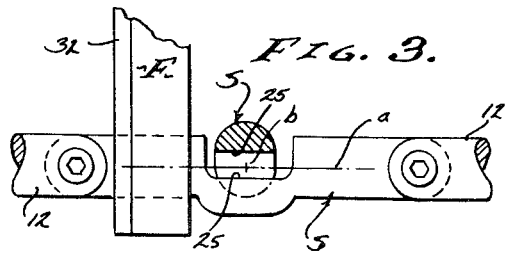
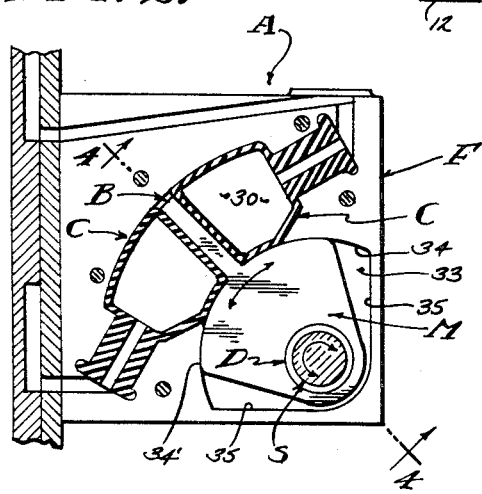
INVENTOR.
PAUL HUSKA
BY
AGENT Nov. 4, 1969     P. HUSKA     3,475,979

AMPLIFIED MECHANICAL ACTUATOR

Original Filed Nov. 30, 1964     2 Sheets-Sheet 2

INVENTOR.
PAUL HUSKA
BY
W. H. Maxwell
AGENT

United States Patent Office 3,475,979
Patented Nov. 4, 1969

3,475,979
AMPLIFIED MECHANICAL ACTUATOR
Paul Huska, 739 Moreno, Los Angeles, Calif. 90049
Continuation of application Ser. No. 414,796, Nov. 30, 1964. This application May 28, 1968, Ser. No. 732,769
Int. Cl. F16h 27/02; F01c 9/00
U.S. Cl. 74—89.16                                    12 Claims

ABSTRACT OF THE DISCLOSURE

This invention relates to pressure operated mechanical actuators and is specifically concerned with amplifying the motion of pressure responsive means, all within one cooperatively related assembly of parts a unified amplified mechanical actuator. The actuator involves a double acting motor responsive to an independent outside pressure source under suitable control, the motor rotation is necessarily limited, and said rotation is augmented or diminished as circumstances require by means of a transmission integrated with the pressure responsive means.

---

Figure 4:
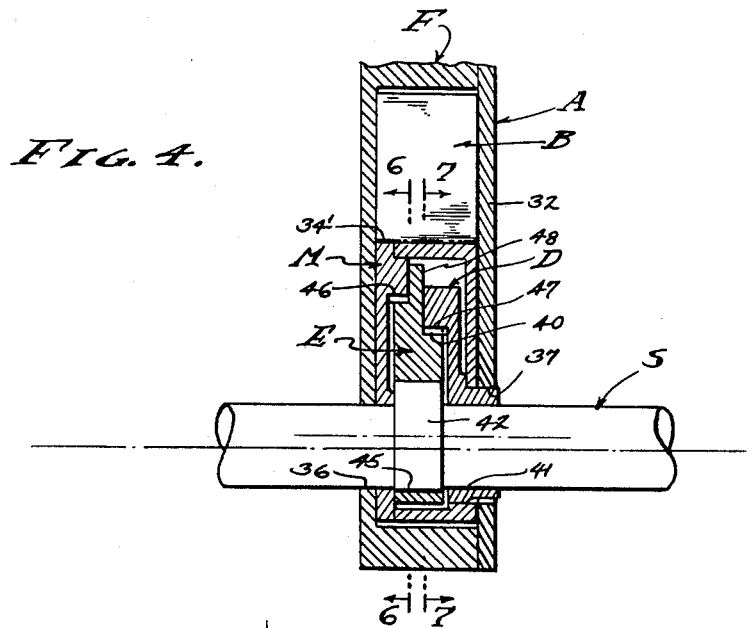

This application is a continuation of application Ser. No. 414,796, filed Nov. 30, 1964, now abandoned, and entitled Amplified Mechanical Actuator.

Mechanical actuators of the rotary type are inherently limited as to the amount of rotation, to be distinguished from a continuously running motor, or complexity must be resorted to in order to extend the limits of rotation. Reference is made to compounded motors which are characterized by a pair of opposed chambers, each of which is adapted to expand or contract with the introduction and exhaust of fluid. That is, this invention is concerned with a fluid or electrically operated motor that is double acting by means of the introduction of pressure from independent sources.

Mechanical actuators of the type under consideration do not ordinarily include motion augmentation or diminution and are limited to reciprocal limits of motion or stroke thereof. For example, a cylinder and piston unit is limited to the distance that the piston can travel in the cylinder, and any similar actuator is also limited to the distance that the movable element can travel. Therefore, rotating actuators that are operated by opposed fluid receiving chambers are normally restricted in their use, because the rotary motion is limited and considerably less than a full turn. In practice, such devices are usually limited to but a small fraction of a turn.

Further, in view of the foregoing, mechanical actuators of the type under consideration can drive through transmission gearing, so as to increase or decrease motion. However, this combination is usually accomplished by joining such an actuator unit with a gear box unit, in which case each of said units is expected to perform its usual function. Also, such a combination results in a cumbersome merger of units, usually double in size when compared with either single unit. Still further, the particular fluid operated unit to be considered herein is characterized by a double ended drive shaft at one side and preferably at one corner thereof, and to this end the marriage of a gear box thereto is prohibitive in certain space environments. Therefore, it is an object of this invention to provide the cooperative combination of a fluid operated actuator and a motion amplifier, all as a single unit of construction, and wherein a double ended output shaft is located at one side or at one corner of the construction of the combined unit.

An object of this invention is to provide an amplified fluid operated actuator that is compact and which is readily made to effect any desired number or fractional parts of a revolution, all as circumstances require, and/or to provide a rotary motion of any predetermined limit, as derived from a compound fluid operated motor, or double acting motor.

It is another object of this invention to provide an actuator of the type thus far referred to wherein the actuating mechanism is so cooperatively associated with the motion amplifying mechanism that minimum space is occupied and wherein any given predetermined displacement of fluid can produce any predetermined rotary displacement.

It is still another object of this invention to provide an actuator of the type under consideration wherein a relatively small degree of oscillation in a vane type fluid displaced element is represented in a relatively large degree of oscillation in a rotating double ended shaft, and wherein the elements involved are advantageously co-axially related and positioned closely adjacent one side or corner of the unit as combined.

Figure 5:
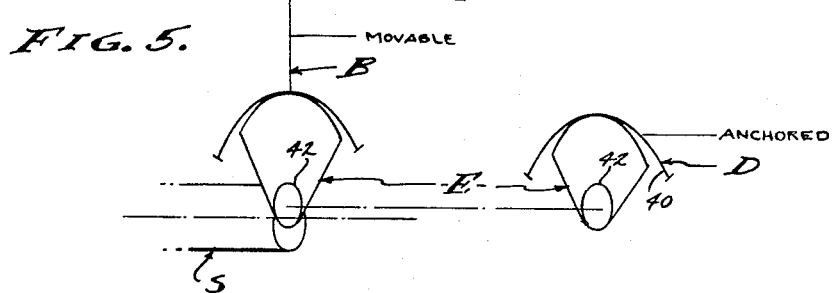
Figure 6:
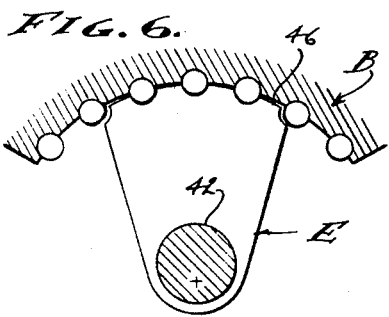
Figure 7:
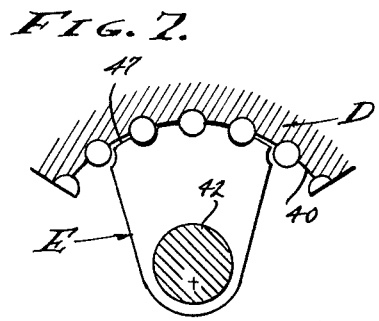

The various objects and features of this invention will be fully understood from the following detailed description of the typical preferred form and application thereof, throughout which description reference is made to the accompanying drawings, in which:

FIG. 1 is a cross sectional view showing a typical installation of a pair of amplified mechanical actuators as provided by the present invention. FIGS. 2 and 3 are detailed views taken substantially as indicated by lines 2—2 and 3—3 on FIG. 1. FIG. 4 is a detailed sectional view taken as indicated by line 4—4 on FIG. 2. FIG. 5 is an exploded diagrammatic view showing the arrangement of elements of the mechanical amplifier, and FIGS. 6 and 7 are sectional views taken as indicated by lines 6—6 and 7—7 on FIG. 4.

In the drawings a vehicle body is illustrated in cross section only, said vehicle having a cylindrical cross section from which the control vanes 10 and 11 project on right angularly related axes $a$ and $b$. The axes $a$ and $b$ intersect at the center longitudinal axis of the vehicle body and said axes $a$ and $b$ are normal to the central body axis so as to be disposed diametrically of the body cross section. In the particular case illustrated, the body has openings to freely pass the stems 12 of the vanes when in the extended operative position.

The body of the vehicle is a round body provided with an actuator compartment 13 and the vanes 10 and 11 are provided in pairs that normally project from diametrically opposite sides of the body, with the stems 12 entering into the compartment 13 for coupled engagement with the amplified actuators as hereinafter described and related. As shown, the inner terminal ends of the stems 12 are formed with flattened ears aligned with the planes of the vanes 10 and 11 respectively, said ears being coupled to mating ears at opposite ends of the actuator driven shaft S, respectively.

With the foregoing construction each pair of diametrically opposite vanes 10 and 11 is actuated together in unison from a common actuator and in accordance with this invention, this is accomplished through direct coupled engagement with opposite ends of the actuator shaft S rotatably carried by an amplified actuator A. Further, and a feature of this invention, the two actuators A are preferably and advantageously identical in form and construction, being cooperatively interrelated so as to independently actuate the vanes 10 and 11 by revolvement of the shafts S which are disposed on said intersecting axes $a$ and $b$.

The shafts S are identical as shown and each is formed and disposed symmetrically relative to the central axis of the vehicle body. The flattened and opposite end portions of the shafts are coupled to the vanes 10 and 11, and in accordance with the invention and in order for the two shafts S to pass each other at the intersection of their respective axes $a$ and $b$, the center portion of each shaft S has a saddle 25, one offset to one side and vice versa. The offset of the saddle 25 is sufficient to permit the limited movement involved, the required turning movement of each shaft being about 20° in the case illustrated.

The actuators A are alike and for all practical purposes can be considered identical, the only difference between the two actuators being the opposite projection of and the rotative position of the shaft S which constitutes the output element of the device. However, the shafts S are alike and they too can be identical. Thus, the placement of the actuators A relative to each other determines the manner of assembly and the selection of shaft S installation. As seen from the drawings, the actuators A are right angularly related, each being spaced transversely from the central axis of the vehicle and displaced from said central axis along its own rotational axis $a$ or $b$ whichever case it may be. In carrying out the invention, the actuators A are positioned adjacent to the shaft S operated by the companion actuator, respectively.

In the drawings I have shown an actuator A which involves a double ended arcuate chamber 30 of segmental form, and a movable element operable along an arcuate axis, said movable element being rotatable on said axis $a$ or $b$, above described. The actuator A involves a chambered frame F in which there is contained a movable part B which constitutes the input element of the device, and glands C to operate against opposite sides of the part B in the chamber of frame F. The actuator is double acting and is capable of substantially quick and uniform operation, the chamber 30 being of rectangular cross section. The stroke in the particular case illustrated is limited. In which case substantially uniform operation is possible with the simplified construction shown wherein the cell-like gland C is simply an inflatable bladder.

The frame F can be fabricated in various ways and is shown, for example, as a chambered body with a face covered by a closure plate 32. The movable element or part B is in the nature of a partition operable to swing through the chamber 30. The chamber 30 is arcuately disposed and there is a lateral extension 33 of the chamber from which the movable part B swings. A composite of the chamber 30 and its extension 33 establishes an opening in the frame F which is readily closed by the plate 32 which is flat.

The movable part B constituting the input element involves, essentially, a lever which revolves on the axis $a$ or $b$ and which acts as a movable partition. In order to provide a chamber in the nature of a cylinder the chamber extension 33 is of segmental configuration, having an arcuate peripheral wall 34 and substantially radial walls 35 projecting radially from bearing openings 36 and 37 in the frame and closure plate respectively. The wall 34 is formed concentrically with the outer arcuate wall. As will be later described, the chamber extension 33 cooperatively accommodates a mechanical rotary amplifier M.

The glands C which characterize the actuator are provided to displace the movable part between opposite ends of the chamber and also to permit free movement of the input element or part B in its function as a piston. Each gland C is a deformable bag-shaped part adapted to receive the application of fluid under pressure and thereby apply a moving force against the movable part B which is engaged by the gland C. The gland C is a cell-like bladder made of pliant and/or elastic material there being a pair of glands C each captured at an opposite end of and within the closed chamber 30. Each gland has a plug-like stem extending therefrom and into a ported opening in the frame F, the gland being formed with well rounded walls that fair one into the other.

In accordance with the invention a mechanical rotary amplifier M is cooperatively related to the frame F and movable part B and is operable through a differential planetary-type section to either increase or to decrease the amount of rotation imparted the output element or shaft S.

An increased speed ratio is illustrated and characterized by a single common internal planetary-like part that revolves through a part revolution only. Generally, the mechanical amplifier M involves, an anchor element D, a driven shaft S, and a sprocket element E. The elements S and E are essentially the only moving elements required, and they operate within the frame F. Additionally, there is the movable part B in the frame F involving a driven segment gear and in this instance in the nature of an internal gear. A characteristic feature of the embodiment illustrated is that the anchor element D, driven shaft S and movable part B are all on a common central axis.

In the preferred form, the mechanical rotary amplifier M is a unit of construction involving a semi-cylindrical case in the form of a shell and which incorporates the driven segment gear element referred to herein as the movable part B. As shown, the said movable part B is a revolvable case with an arcuate wall 34' slideably engageable with the wall 34 of chamber 33. The said case houses the anchor element D and driven shaft S, and the case is rotatably journaled in the frame F on the axis common to the parts D and S. In practice, the movable case part B has bearings rotatable on the shaft S and part D respectively.

The movable case part B is a drive element and is referred to as being in the nature of a driven segment gear, being in the form of a segment of a ring with an equally spaced series of internal projections. As shown, this segmental ring gear is formed in or carried by the wall of the case which forms the part B.

The anchor element D enters the case or segmented ring gear above described and comprises a reaction connection in the form of a segmented sprocket 40. The sprocket 40 is an enlarged flange-shaped part that is fastened to the frame F and has a central bearing opening 41 to rotatably pass the driven shaft S.

The driven shaft S constituting the output element enters the frame F as above indicated and carries an eccentric 42 operable within the frame or ring gear segment of part B and rotatably carrying the sprocket element E. However, the eccentric 42 is adapted to turn whereas element D is fixedly positioned. As shown, the anchor element D is tubular, whereby the shaft S rotatably extends therethrough in the bearing opening 41. In the case illustrated, the shaft S is also rotatably journaled in the bearing opening 36 of frame F. The said eccentric 42 has its throw axis laterally offset from and parallel with the axis A of rotation. The throw or radius of the eccentric 42 is dictated by and equal to the difference in pitch diameter between th drive element B and driving sprocket 46 hereinafter described.

The sprocket element E revolves on the eccentric 42 and operates between and has coupled driving engagement with the driven shaft S, anchor element D and also with the movable part B. In accordance with the invention, the element E is a segmental part that involves a central bearing 45, a driving sprocket 46 and a driven sprocket 47. The said segmental part comprising the element E is of such longitudinal extent as to occupy the case intermediate the eccentric and sprocket 40. The sprockets 46 and 47 are segmental parts arranged adjacently and in the preferred form there is a bearing plate 48 projecting from and therebetween, and guided between peripherally disposed faces of the two sprockets. The plate 48 is moved by the driving sprocket 46 through a planetary motion.

The segmental driving sprocket 46 is smaller in pitch diameter than the drive element B and is meshed therewith. In the case illustrated the driving sprocket 46, if a full circle, would be a twenty-one tooth element.

The segmental sprocket 47 is smaller in pitch diameter than the driving sprocket 46 and is connected therewith. In the case illustrated, the drive sprocket 47, if a full circle, would be a seventeen tooth element.

The segmental drive part B if turned, for example, one revolution clockwise, the driving sprocket 46 would progress relatively 2/21 revolution counterclockwise. The driving sprocket 46 being smaller than the movable drive part B moves through its oscillatory motion reversely at a reduced rate as determined by the relative 23 to 21 ratio.

The sprocket element E moving at said reduced rate of 2/21 is engaged with the sprocket 40 through the sprocket 47. The sprocket 40 being larger than said sprocket 47 moves reversely relative thereto in a forward direction at an increased rate as determined by the relative 19 to 17 ratio. The resultant speed reduction is the difference between the low of 2/21 in said first engagement and the gain of 2/19 in said second engagement multiplied by the ratio of sprockets 27 and 21, or 17/19. The product of these ratios is 136/6783 and with a final ratio at the driven shaft 20 of 49.875 to 1. Thus, the gearing in frame F amplifies the movement of the input element or part B, shaft S being the output element.

From the foregoing it will be seen that I have provided a unique and advantageous merger of a pressure operated actuator and a mechanical semi-rotary amplifier, which as a unit of construction requires no more space than that required of the actuator alone. Further, the provision of a mechanical rotary amplifier, having a double ended drive shaft at one side or at one corner of an actuator of the type under consideration, is highly advantageous, as it is in the particular environment illustrated herein. However, the integral combined actuator and mechanical rotary amplifier as hereinabove described is useful in many situations where motor drive motion is limited or restricted to a small fraction or segment of a revolution and where highly augmented output of motion is required.

Having described only a typical preferred form and application of my invention, I do not wish to be limited or restricted to the specific details herein set forth, but wish to reserve to myself any modifications or variations that may appear to those skilled in the art.

Having described my invention, I claim:

1. A pressure operated and speed changing actuator including: a frame with a segmental chamber formed therein about a rotational axis; pressure responsive means with a part movable in an arcuate path concentric with said axis and through the chamber in the frame; and an angular displacement amplifier to move an output drive part and comprising two pairs of segmental varied ratio and independently meshed elements operable within said chamber; the first pair of said elements having a segmental internal gear form and a segmental external gear meshed therewith and one of which is the input and integral with the part movable in the chamber and the other the output drive part; the second pair of said elements having a segmental internal gear form integral with a part fixed in the frame and a segmental external gear form meshed therewith; the two segmental external gear forms being inter-connected and rotatably carried together on one eccentric, whereby movement of said part in the chamber results in differing movement of the output drive part.

2. The pressure operated and speed changing actuator as set forth in claim 1, wherein the first pair of said elements of the angular displacement amplifier is of lesser gear reduction than the second pair of said elements.

3. The pressure operated and speed changing actuator as set forth in claim 1, wherein the segmental internal gear form of the first pair of said elements is the input and integral with the part movable in the chamber.

4. The pressure operated and speed changing actuator as set forth in claim 1, wherein the angular displacement amplifier augments movement of said part movable through the chamber in the frame, wherein the first pair of said elements of the angular displacement amplifier is of lesser gear reduction than the second pair of said elements and the segmental internal gear form thereof is the input and integral with the part movable in the chamber, and wherein the second pair of said elements of the angular displacement amplifier is of greater gear reduction than the first pair of said elements.

5. A pressure operated and speed changing actuator with a drive shaft offset to one side thereof, and including: a frame with a segmental chamber formed therein and said chamber being described about an axis disposed at one side of the frame; pressure responsive means with a part movable in an arcuate path through the outer portion of the chamber; and an angular displacement amplifier to move an output drive part and comprising two pairs of segmental varied ratio and independently meshed elements operable within the inner portion of the chamber; the first pair of said elements having a segmental internal gear form and a segmental external gear form meshed therewith and one of which is the input and integral with the part movable in the chamber and the other the output drive part; the second pair of said elements having a segmental internal gear form and a segmental external gear form meshed therewith and one of which is anchored in the frame; the two segmental external gear forms being inter-connected and rotatably carried together on one eccentric, whereby movement of said part in the chamber results in differing movement of the output drive part.

6. The pressure operated and speed changing actuator with the offset drive shaft as set forth in claim 5, wherein the first pair of said elements of the angular displacement amplifier is of lesser gear reduction than the second pair of said elements.

7. The pressure operated and speed changing actuator with offset drive shaft as set forth in claim 5, wherein the segmental internal gear form of the first pair of said elements is the input and integral with the part movable in the chamber.

8. The pressure operated and speed changing actuator with offset drive shaft as set forth in claim 5, wherein the angular displacement amplifier augments movement of said part movable through the chamber in the frame, wherein the first pair of said elements of the angular displacement amplifier is of lesser gear reduction than the second pair of said elements and the segmental internal gear form thereof is the input and integral with the part movable in the chamber, and wherein the second pair of said elements of the angular displacement amplifier is of greater gear reduction than the first pair of said elements.

9. A rotary fluid pressure operated and speed changing actuator with a drive shaft offset to one side thereof, and including: a frame with a segmental chamber formed therein and described about an axis disposed at one side of the frame; fluid pressure responsive means with a part movable in an arcuate path through the outer portion of the chamber; and an angular displacement amplifier to move an output drive part and comprising two pairs of segmental varied ratio and independently meshed elements operable within the inner portion of the chamber; the first pair of said elements having a segmental internal gear form and a segmental external gear form meshed therewith and one of which is the input and integral with the part movable in the frame and the other the output drive part; the second pair of said elements having a segmental internal gear form and a segmental external gear form meshed therewith and one of which is anchored in the frame; the two segmental external gear forms being inter-connected and rotatably carried together on one eccentric, whereby movement of said part in the chamber results in differing movement of the output drive part.

10. The rotary fluid pressure operated and speed changing actuator with offset drive shaft as set forth in claim 9, wherein the first pair of said elements of the angular displacement amplifier is of lesser gear reduction than the second pair of said elements.

11. The rotary fluid pressure operated and speed changing actuator with offset drive shaft as set forth in claim 9 and wherein the segmental internal gear form of the first pair of said elements is the input and integral with the part movable in the chamber.

12. The rotary fluid pressure operated and speed changing actuator with offset drive shaft as set forth in claim 9, wherein the angular displacement amplifier augments movement of said part movable through the chamber in movement of said part movable through the chamber in the frame, wherein the first pair of said elements of the angular displacement amplifier is of lesser gear reduction than the second pair of said elements and the segmental internal gear form thereof is the input and integral with the part movable in the chamber, and wherein the second pair of said elements of the angular displacement amplifier is of greater gear reduction than the first pair of said elements.

References Cited

UNITED STATES PATENTS

| 2,376,746 | 5/1945 | Zimmerman | 92—121 |
| 3,208,293 | 9/1965 | Boehm | 74—89.16 |

MILTON KAUFMAN, Primary Examiner

U.S. Cl. X.R.

92—121